United States Patent [19]

La Bell, Jr.

[11] Patent Number: 5,404,850

[45] Date of Patent: Apr. 11, 1995

[54] ROTARY COMBUSTION ENGINE WITH OPPOSITELY ROTATING DISCS

[76] Inventor: Oldric J. La Bell, Jr., 121 Selden Rd., Newport News, Va. 23606

[21] Appl. No.: 236,462

[22] Filed: May 2, 1994

Related U.S. Application Data

[63] Continuation-in-part of Ser. No. 987,207, Dec. 8, 1992, abandoned.

[51] Int. Cl.⁶ .............................................. F02B 31/00
[52] U.S. Cl. ..................................... 123/263; 418/219
[58] Field of Search ................ 123/234, 236; 418/211, 418/212, 219

[56] References Cited

U.S. PATENT DOCUMENTS

| | | | |
|---|---|---|---|
| 3,726,259 | 4/1973 | Graves | 123/236 |
| 3,769,945 | 11/1973 | Kahre | 418/219 |
| 3,838,954 | 10/1974 | Rapone | 418/219 |
| 3,848,575 | 11/1974 | Williams | 123/236 |
| 3,942,484 | 3/1976 | Piles | 418/219 |
| 5,076,228 | 12/1991 | Bowitz | 123/236 |

*Primary Examiner*—Richard A. Bertsch
*Assistant Examiner*—Charles G. Freay
*Attorney, Agent, or Firm*—Wallace J. Nelson

[57] ABSTRACT

A rotary internal combustion engine including a rotatable drive shaft, a first rotatable disc secured to and rotatable with the drive shaft, a second disc rotatably disposed through a geared connection about the drive shaft for opposite rotation relative to the first disc; and a fixed partition rotatably receiving the drive shaft and being sandwiched between the first and second rotatable discs. Each of the first and second rotatable discs are provided with annular channels facing, and closed by the partition. Dams are provided on the partition faces to close and divide the annular channels in each of the rotatable discs into a pair of arcuate chambers. A pair of vanes are retractably disposed in spaced relationship within each annular chamber, dividing the arcuate chambers into separate intake/compression and combustion/exhaust chambers. An air/fuel mixture is supplied to each disc, compressed therein by the intake/compression chamber, and transferred through the partition, to the combustion/exhaust chamber in the other disc for combustion. The combustion gases expand and act against the respective vanes to drive both discs and provide rotary output to the drive shaft.

17 Claims, 12 Drawing Sheets

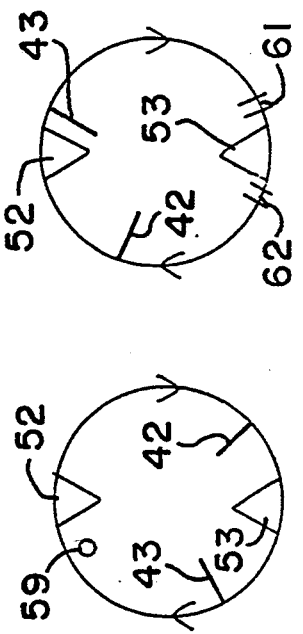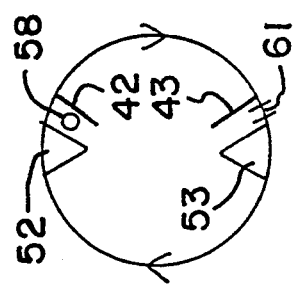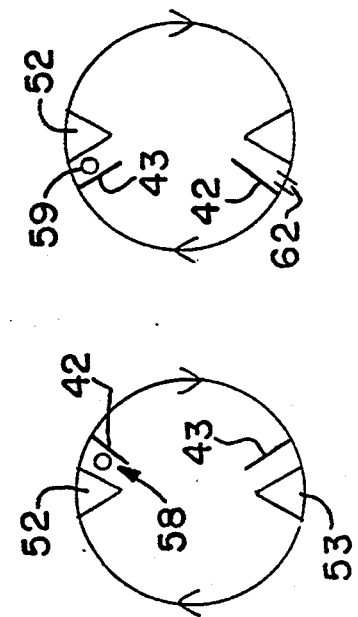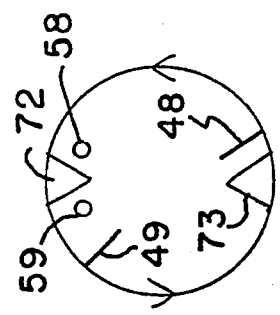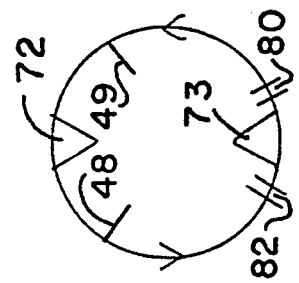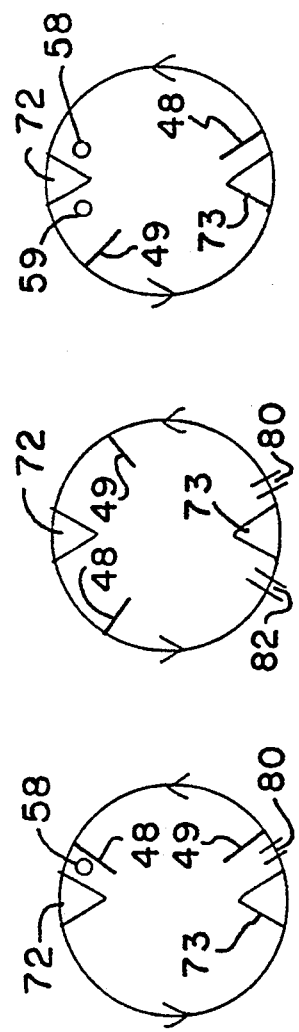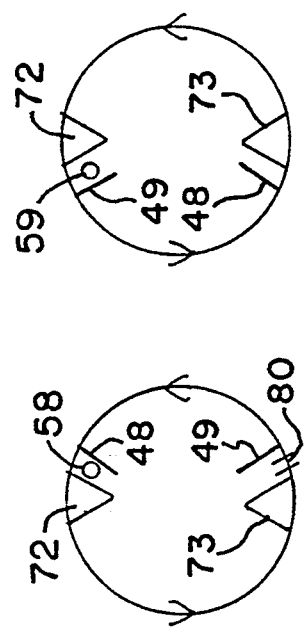
FIG.15A FIG.14A FIG.13A FIG.12A FIG.11A
FIG.15B FIG.14B FIG.13B FIG.12B FIG.11B 5,404,850

ROTARY COMBUSTION ENGINE WITH OPPOSITELY ROTATING DISCS

RELATED APPLICATIONS

This application is a Continuation-in-Part of application Ser. No. 07/987,207, filed Dec. 8, 1992, now abandoned.

FIELD OF THE INVENTION

This invention relates generally to internal combustion engines and relates specifically to a rotary internal combustion engine having a pair of counter-rotating disc elements sandwiching a stationary partition therebetween.

BACKGROUND OF THE INVENTION

Rotary internal combustion engines are known in the prior art. Most of the presently available rotary engines are difficult to construct and are replete with various unsatisfactory operating features. Some of the known rotary internal combustion engines employ alternate rotors for providing power to a drive train, are noisy and inefficient in operation.

It is an object of the present invention to provide an efficient rotary internal combustion engine that relies on counter-rotating rotors to provide the power to a drive shaft.

It is another object of the present invention to provide an improved rotary internal combustion engine that is quiet and efficient in operation, has very little reciprocating motion and is relatively free from maintenance problems.

Another object of the present invention is to provide a rotary internal combustion engine wherein all rotating parts are maintained at a constant distance from their center of rotation.

A further object of the present invention is to provide a rotary internal combustion engine having a limited number of reciprocating moving parts and to provide only limited movement and light weight construction for the reciprocating moving parts.

SUMMARY OF THE INVENTION

The foregoing and additional objects are attained, according to the present invention by providing a rotary internal combustion engine having a pair of counter-rotating disc elements supported by a drive shaft and having a partition sandwiched therebetween. The partition is provided with a pair of parallel, flat sides and is rotatably supported by the drive shaft.

The first disc element is secured to and rotatable with the drive shaft and in engaged, rotatable, relationship with one of the flat surfaces formed on the partition. The second disc element is rotatably secured to the partition and rotatably retained on the drive shaft in rotatable, engaged, relationship with the other of the flat surfaces provided on the partition.

Each of the first and second disc elements is provided with an open, annular shaped, channel formed in the surface thereof disposed in abutting relationship with a flat surface of the partition. The flat surfaces of the partition thus serve to close the open annular channel in each of the first and second disc elements to provide a closed annular chamber between each of the disc elements and the partition. A pair of raised dams are provided on each of the flat surfaces of the partition and serve to extend into, and divide each of the closed annular chambers into a pair of arcuate chambers. Each of the dams are provided with a pair of opposite, inclined or sloping, surfaces. A pair of spring loaded vanes are disposed in spaced relationship in each of the open annular chambers formed in each of the first and second disc elements. Each of the vanes extend across one of the closed annular chambers to form separate compartments therebetween and between the vanes and the pair of raised dams. Each of the vanes is angularly disposed within the annular chambers such that the first surface of a dam member contacted by one of the vanes during disc rotation is essentially normal to the contacting surface of the vane to thereby reduce shock forces on the vanes.

At least one of the separate compartments in each of the first and second discs serves as an intake/compression chamber and another of the separate compartments in each of the first and second discs serves as the combustion and exhaust chamber. Fuel intake ports are provided in the intake and compression chambers and exhaust pods are provided in the combustion and exhaust chambers to exhaust the combustion gases therefrom. Transfer ports provide fluid communication, through the partition, between the intake/compression chambers in the first disc and the combustion/exhaust chamber of the second disc; and between the intake/compression chamber of the second disc and the combustion/exhaust chamber of the first disc. Suitable valves are provided to selectively open and close these ports and control the fluid communication therebetween. The fuel and air mixture compressed in the intake/compression chamber of the first disc is transferred to the second disc for combustion and the fuel mixture inducted and compressed in the second disc is transferred to the first disc for combustion. A suitable conventional ignition device, such as a spark plug, is provided in each combustion chamber for ignition of the compressed fuel mixture received therein. The disc elements are constructed to provide two intake/compression and two combustion/exhaust release cycles for each revolution of the discs.

BRIEF DESCRIPTION OF THE DRAWINGS:

A more complete appreciation of the invention and many of the attendant advantages thereof will be more readily apparent as the same becomes better understood when considered in reference to the accompanying drawings wherein:

FIGS. 11A through 15B schematically illustrate the firing cycle of the rotary internal combustion engine of the present invention;

DETAILED DESCRIPTION

Figure 1:
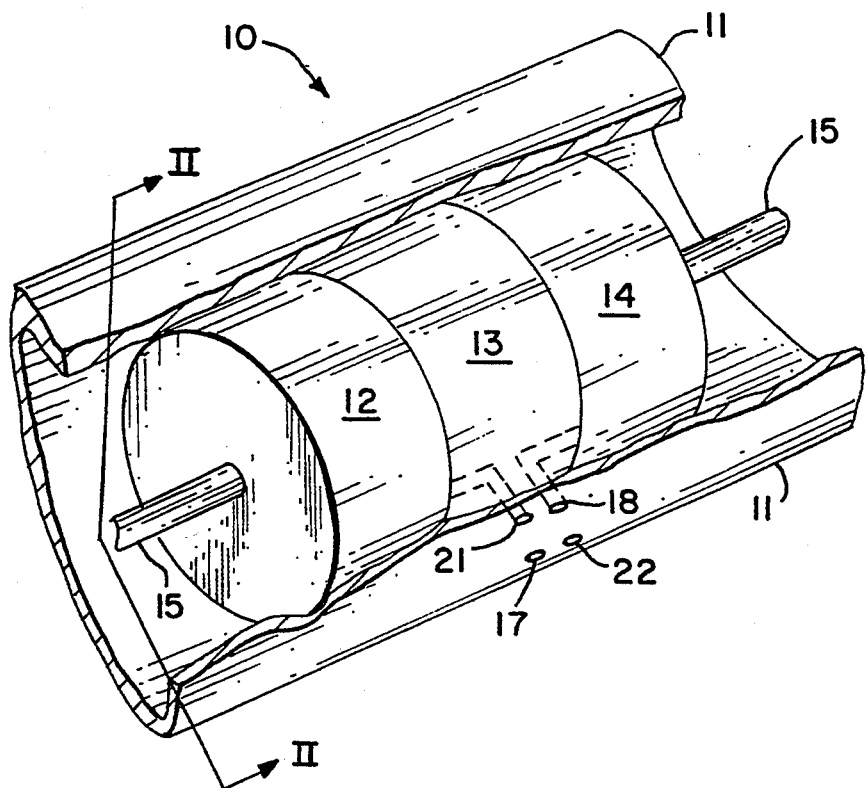
FIG. 1 is a part schematic, perspective view, with parts broken away, of a rotary internal combustion engine according to the present invention.
Figure 2:
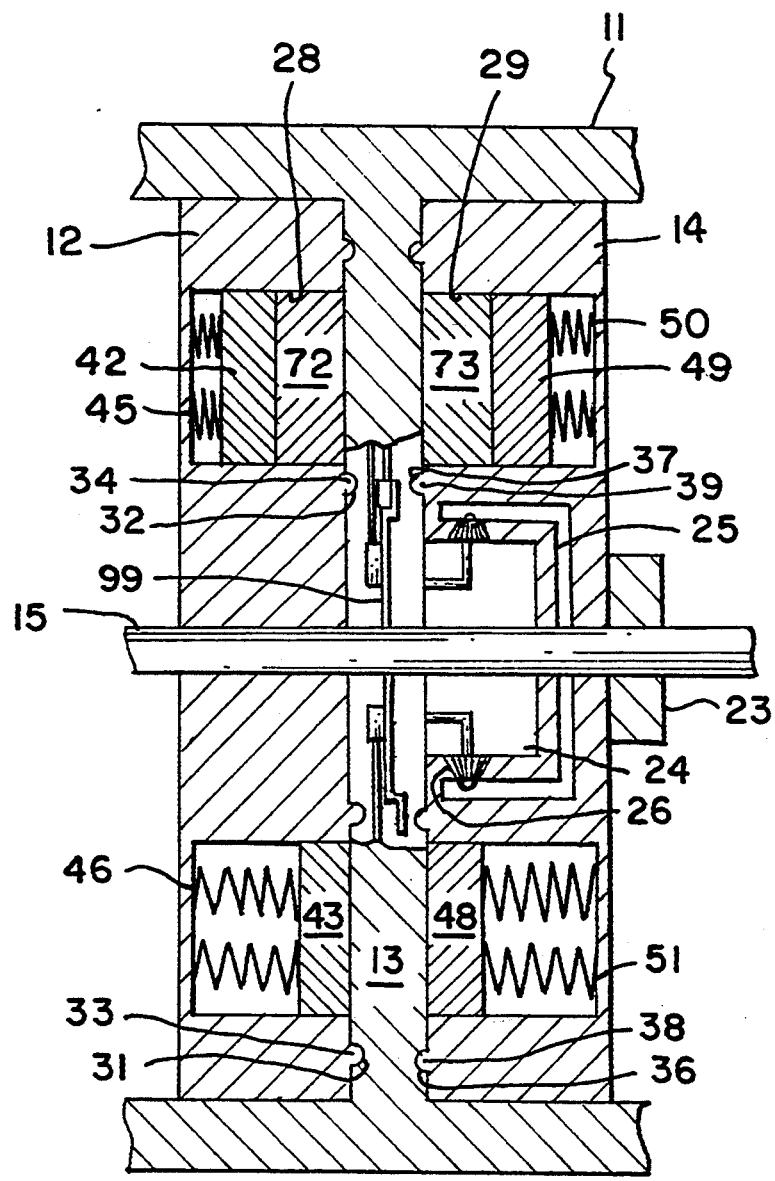
FIG. 2 is a sectional, part schematic view, with parts omitted, of the rotary combustion engine of the present invention as seen taken along line II—II of FIG. 1.

Referring now to the drawings, and more particularly to FIGS. 1 and 2, an exemplary rotary internal combustion engine according to the present invention is shown and designated generally by reference numeral 10. Rotary engine 10 includes a housing 11 containing a forward rotating disc element 12, a circular partition 13, and a rear rotating disc element 14, all disposed on a central drive shaft 15.

Suitable fuel inlet ports 17 and 18 extend through housing 11, and through fuel channels (not designated) in partition 13 leading to intake/compression chambers in each of rotary disc elements 12 and 14, as will be further explained hereinafter. Also, suitable exhaust ports 21,22 are provided through housing 11 and lead from respective rotary disc elements 12 and 14, through exhaust channels (not designated) in partition 13 to exhaust or permit expulsion of combustion gases from disc elements 12 and 14, as will also be further explained hereinafter.

Front disc element 12 is secured to drive shaft 15, in a conventional manner, for clockwise rotation therewith, while rear rotary disc 14 is relatively rotatable about drive shaft 15 in an opposite, or counter-clockwise direction, relative to front disc 12.

As shown more particularly in FIG. 2, an annular integral portion 25 of rear disc 14 is disposed within a central cavity provided therein to provide a geared connection between drive shaft 15 and rear disc 14, as will be further explained hereinafter. Also, a retention flange or lug 23 is secured about drive shaft 15 in abutting relationship with the rear surface of rear rotary disc 14. Lug 23 helps to maintain disc 14 in rotating relationship about drive shaft 15 and in rotating contact with the rear surface of partition 13.

Each of front disc 12 and rear disc 14 is provided with an annular trough or channel in one surface thereof, as designated by respective reference numerals 28,29. Channels 28 and 29 each form three sides of a combustion chamber within the respective discs, with the fourth side of the respective combustion chambers being formed by the abutting, essentially flat, parallel, sides of partition 13. A pair of annular grooves are provided within each of the essentially flat sides of partition 13 to accommodate a pair of ring, ridged, protrusions formed on each of discs 12 and 14. The annular grooves formed in the front, essentially flat, surface of partition 13 are designated by reference numerals 31 and 32, and serve to receive respective ring ridge protrusions 33 and 34 formed on front disc 12. Similarly, a pair of annular grooves formed in the rear, essentially flat, surface of partition 13 are designated by reference numerals 36 and 37. The ring, ridge, protrusions extending from rear disc 14 and received by grooves 36,37 are designated, respectfully, by reference numerals 38,39.

Each of annular channels 28 and 29, of respective rotary discs 12 and 14, is provided with a pair of spring urged vanes or gates, serving to divide the respective channels 28,29 into two arcuate chambers, as will be further explained hereinafter. The vanes in rotary disc 12 are designated by reference numerals 42 and 43 and are provided with respective springs 45,46. The closure vanes in rotary disc 14 are designated by reference numerals 48,49 and the springs biasing these vanes into channel 29 are designated, respectfully, by reference numerals 51,52.

Figure 3:
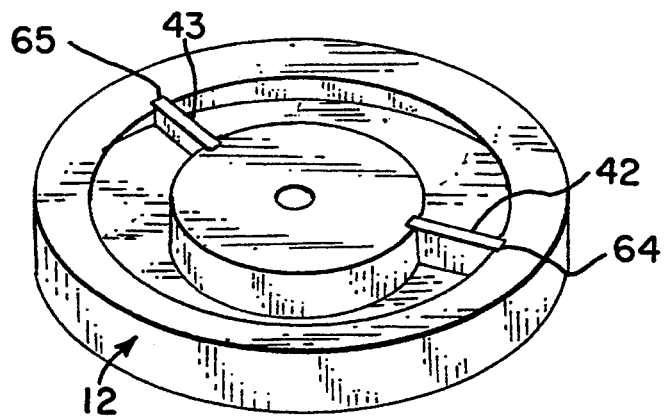
FIG. 3 is a schematic view of the front disc of the rotary combustion engine shown in FIG. 1 as seen looking toward the open side thereof, and with parts omitted therefrom.

Referring now more particularly to FIG. 3, the relative position of vanes 42,43 in channel 28 of rotary disc 12, is illustrated. As shown therein, grooves 64,65 are provided in the side walls of channel 28 to permit sliding movement of vanes 42,43 therein. Movement of vanes 42,43 and 48,49 is basically lateral, and not radial, and essentially parallel with the axis of drive shaft 15. Springs 45,46 are not visible in this illustration but would be disposed against the top portion of disc 12 that is cut-away and serve to direct a force against the top edge of vanes 42 and 43.

Figure 4:
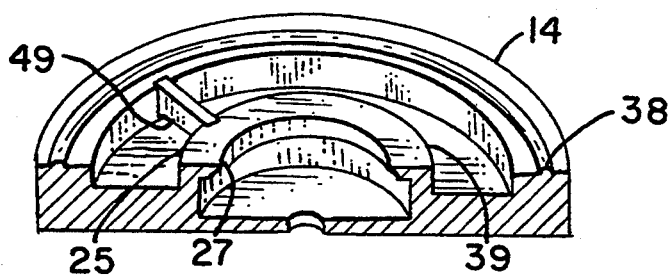
FIG. 4 is a part sectional, part perspective view of the open side of the rear disc of the rotary combustion engine shown in FIG. 1.

FIG. 4 is a part sectional, part schematic, view of the portion of rear rotary disc 14 that engages partition 13. The gear teeth 27 on the internal annular portion 25 of disc 14 that forms part of the gear connection with partition 13, is illustrated in this FIG. Also, ridge rings 38 and 39, received within annular grooves 36,37 (FIG. 2) of partition 13, are shown. As described hereinbefore, the groove-ring engagement ensures a tight, yet rotatable, connection between rotary disc 14 and partition 13. One of the vanes (49) and the grooves therefor (not designated) provided in the walls of channel 29, are also shown in this FIG.

Figure 5:
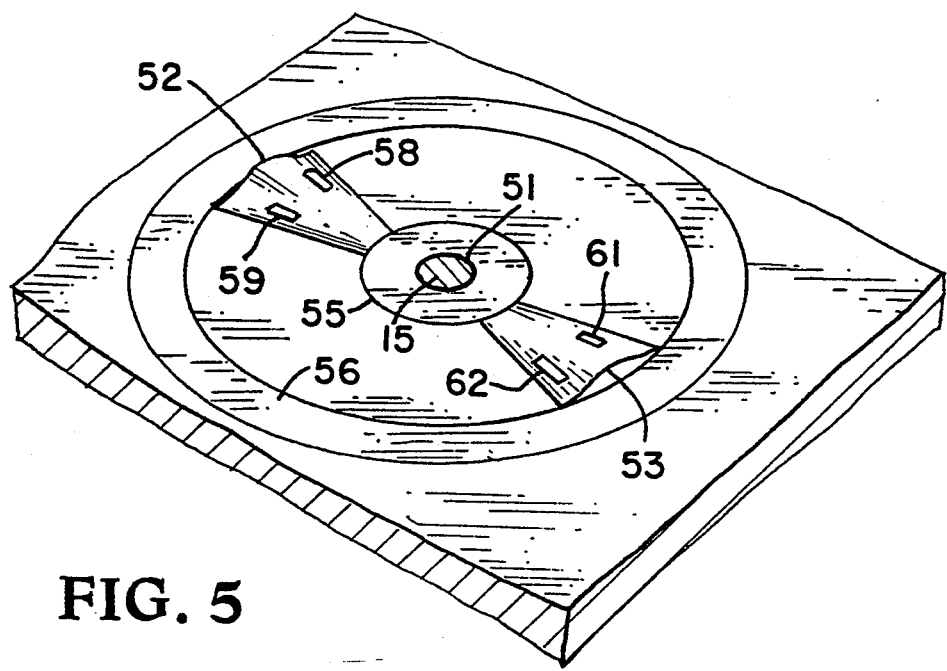
FIG. 5 is a view illustrating the raised areas disposed on one of the two essentially flat surfaces provided on the partition of the rotary combustion engine shown in FIG. 1.

Referring now to FIG. 5, one of the essentially flat face surfaces on circular partition 13 is illustrated. Circular partition 13 is an integral extension of motor housing 11. For the sake of brevity, only one of the two essentially flat face surfaces on circular partition 13, and the relation thereof to an abutting rotary disc will be described in detail, it being understood that the other essentially flat face surface is identical in structure and function. Thus, the flat face surface described here in detail is in reference to the contacting surface of the front rotary disc 12.

As shown therein, a central opening 51 extends through partition 13 and serves to receive drive shaft 15. A pair of raised areas, or dams, are provided on an arcuate line spaced from the periphery of partition 13, as designated by reference numeral 52,53. Dams 52,53 are dimensioned and located such that they penetrate, or extend into, channel 28 of disc 12 to fully occupy or obstruct channel 28 at the area of both dam 52 and 53. The sides of dams 52,53 are sloped, or inclined, and disposed concentric with drive shaft 15. Thus, dams 52,53 fit closely with the side walls of annular channel 28 such that virtually an air-tight seal or block is made between the annular channel bottom, side walls, and the dams.

The elevation of dams 52,53 above the essentially flat surface of partition 13 is parallel to the axis of rotation of disc 12, that is, lateral and not radial. Although the dams 52,53 fit closely against the bottom and sidewalls of annular channel 28, they do not inhibit free relative rotation between partition 13 and disc 12.

The leading and trailing edges of dams 52,53 are sloped, or inclined, such that, in cross section, the dams have the appearance of a flattened bell shape. Reference numerals 55,56 indicate the inner and outer circles that would be circumscribed by the edges of annular channel 28 when rotary disc 12 is positioned thereon. The annular grooves (31,32) in partition 13 for receiving ridge rings 33,34 are not illustrated in FIG. 5 in the interest of clarity.

A pair of fuel transfer ports 58,59 (FIG. 5) are disposed extending through the respective sloping faces of dam 52, the function of which will be further explained hereinafter. An exhaust port 61 and an intake port 62 are disposed extending through, the respective sloping faces of, dam 53 and the function of which will, also, be further explained hereinafter.

Figure 6A:
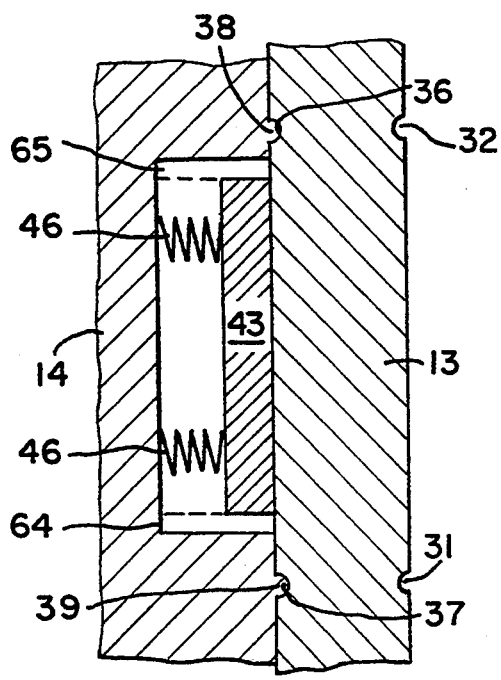
FIG. 6A and 6B are part sectional, part schematic views of the spring urged vanes disposed in the rear disc member of the present invention.

FIG. 6A is an enlarged, part sectional, part schematic, view of vane 49 and the springs 50 therefor biasing the vane to close annular channel 29 formed in rotary disc 14. As shown therein, a pair of guide grooves 64,65 are formed in the sidewalls of channel 29 and extend into the depressed area within the body of disc 14 that houses springs 50. Guide grooves 64,65 serve as guides for the reciprocating movement of vane 49. Thus, when disc 14 rotates to position vane 49 in contact with one of the dam members disposed on the rear essentially flat surface of partition 13, the sloping surface of the dam causes vane 49 to depress springs 50 and permit the vane to be retracted along guide grooves 64,65 and received within the body of the disc. When rotary disc 14 rotates vane 49 over the dam member, the declining sloping surface of the dam member again permits springs 50 to force vane 49 back into annular channel 29. The function of each of the other vanes 42,43 and 48 is identical to that of vane 49 and is not further elaborated on here in the interest of brevity.

Figure 6B:
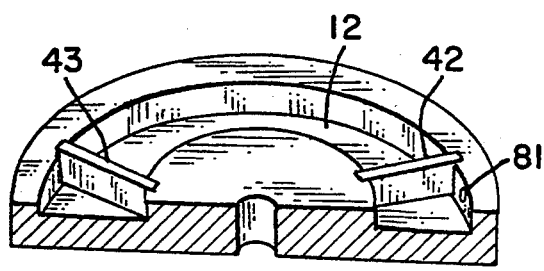

FIG. 6B is a part sectional, part schematic, view of the vane arrangement in front rotary disc 12 described hereinbefore in reference to FIGS. 2 and 3.

Figure 7A:
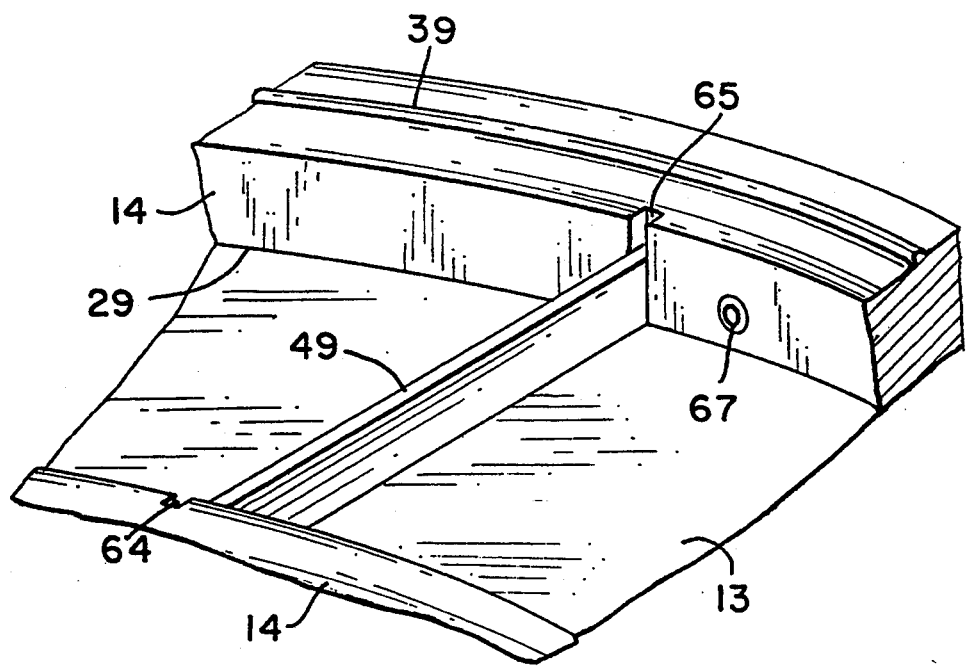
FIG. 7A is an illustration of one of the spring urged vanes employed in the present invention and disposed at essentially ninety degrees relative to the contacting surface of the partition.

FIG. 7A is a part schematic view of vane 49 disposed in guide grooves 64,65 with parts omitted and parts broken away. Vane 49, in this illustration, is disposed essentially ninety degrees relative to the bottom surface of channel 29 and is shown partially extending into the channel. A spark plug 67 is disposed through a side wall of channel 29 adjacent vane 49 and serves to ignite a fuel mixture therein, as will be further explained hereinafter. Spark plug 67 is connected in a conventional manner to a suitable and conventional electric distributer system.

Figure 7B:
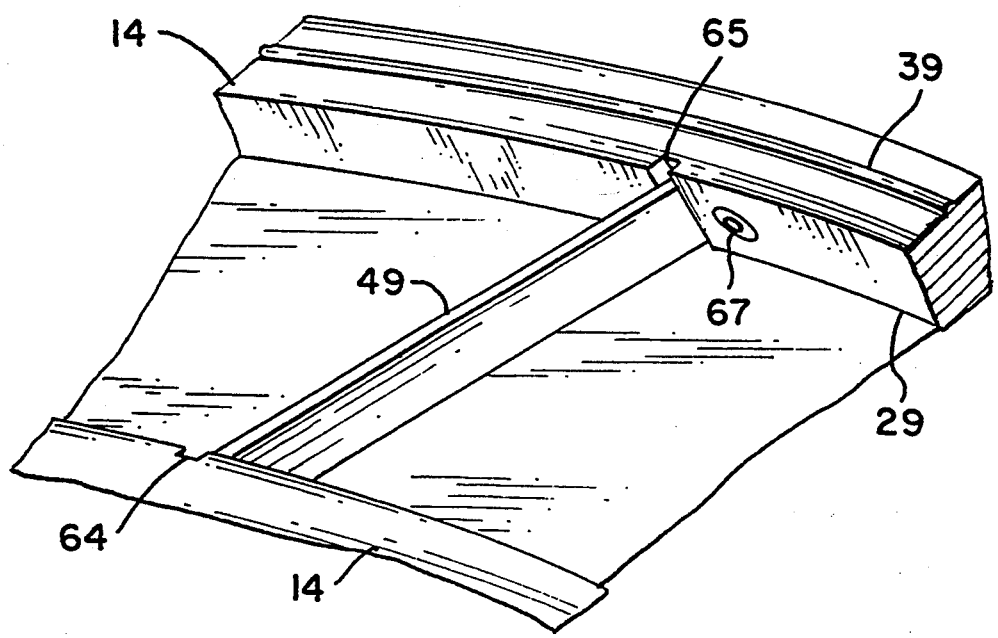
FIG. 7B is a view similar to FIG. 7A and showing the spring urged vane disposed at an angle of approximately sixty degrees relative to the contacting surface of the partition.

FIG. 7B is a part schematic view, similar to FIG. 7A, and illustrating the preferred arrangement for vane 49. In this illustration, vane 49 is supported in angular guide grooves 64,65 and disposed at an angle of approximately sixty degrees relative to the bottom of channel 29. The advantages of this angular relationship will be further explained hereinafter. As discussed hereinbefore, vane 49 and its operation are identical to that of vanes 42,43 and 48. Because the dam surfaces create a partition or blockage for the respective channels 28,29, the movement of the vanes 42,43 48 and 49, in and out of the channels, is essentially parallel to the axis of rotation, or lateral. Thus, when the rotary discs are operating, enclosed volumes are created within segments of each of channels 28,29 as bounded on one end by the respective dams and on the other end by the respective vanes. As the disc is rotated, this volume is increased as a vane moves away from a dam and is decreased as a vane approaches a dam. As discussed hereinbefore, front disc element 12 rotates clockwise, while rear disc 14 rotates at the same speed in a counter-clockwise direction.

Figure 8:
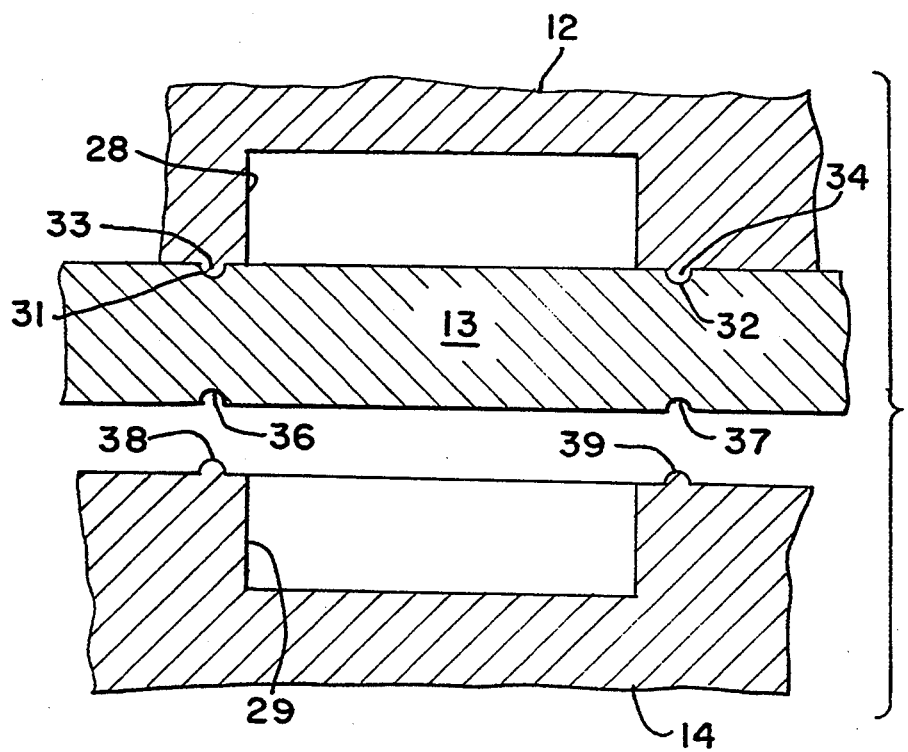
FIG. 8 is a schematic illustration of the grooves and ridge rings provided in the respective partition and rotary discs of the present invention.

Referring now to FIG. 8, this part schematic view more clearly illustrates the cooperating relationship between annular grooves 31,32,36 and 37 formed on the essentially flat face surfaces of partition 13, and the ridge rings 33,34 provided on front disc 12 and ridge rings 38,39 on rear disc 14.

Figure 9A:
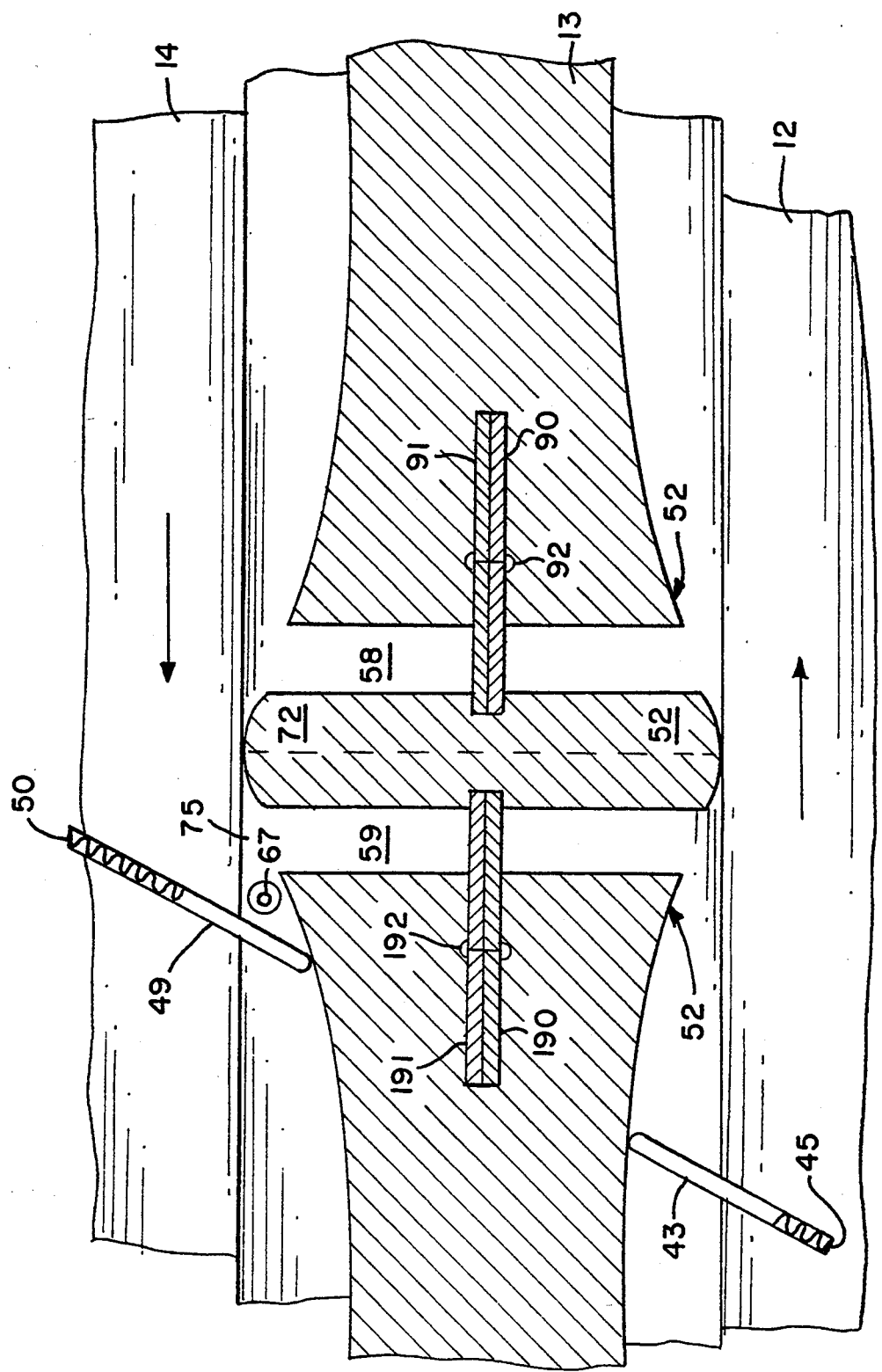
FIG. 9A is a part schematic, part sectional view of the dams disposed at the 12:00 O'clock position on both the front and rear essentially flat surfaces of the partition, showing the relationship therewith with a vane member in each of the front and rear rotary disc members and illustrating the fuel transfer passageway and valves disposed within the partition member.
Figure 10:
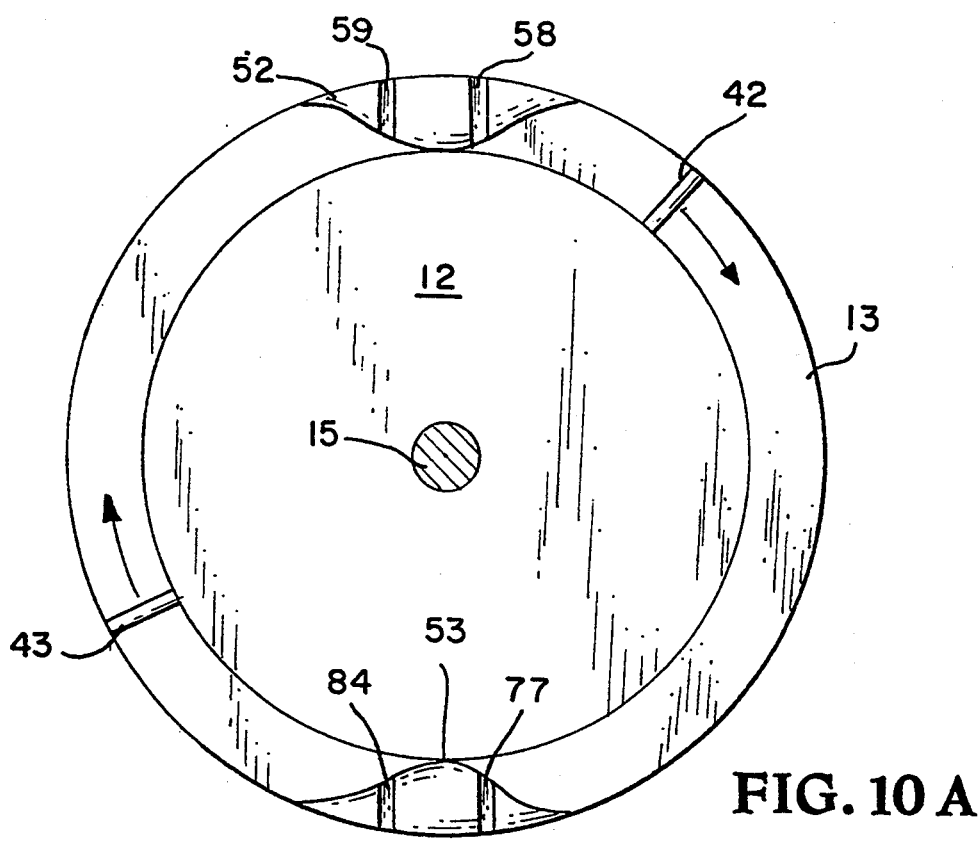
FIGS. 10A and 10B are schematic plan views further illustrating the dam and vane interactions with the fuel intakes and exhaust ports in the partition member.
Figure 10:
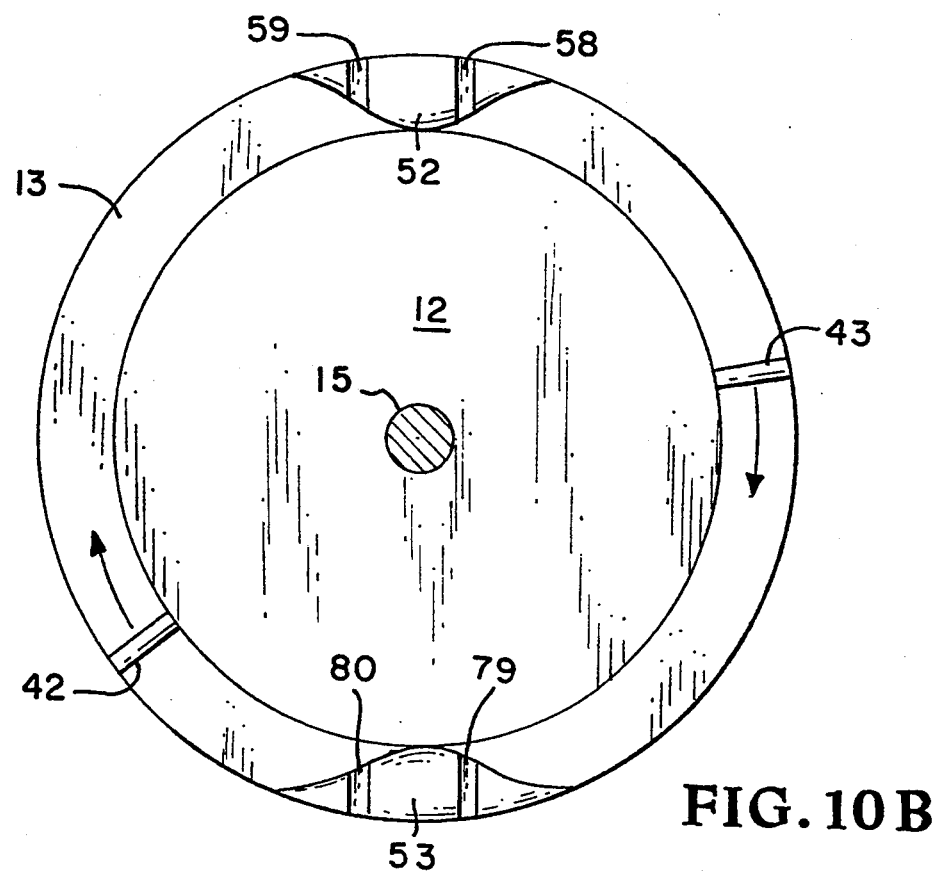

Referring now to FIG. 9A, a schematic illustration of the upper dam on both the front and the rear essentially flat surfaces of partition 13, is shown. For descriptive purposes, the dam at the 12:00 O'clock position on the front flat surface of partition 13 is designated as dam 52 (FIG. 5) and the dam at the 6:00 O'clock position is designated by reference numeral 53 (FIGS. 10A and 10B).

During disc rotation, when vane 43 in front disc 12 is 5–15 degrees to the left of dam 52, (adjacent the 12:00 O'clock position on partition 13) the air/fuel mixture compressed between vane 43 and dam 52 is transferred, via transfer port 59 through partition 13, to the space designated by reference numeral 75 in rear disc 14 (FIG. 9A). The compressed air/fuel mixture is ignited by spark plug 67 disposed in this 12:00 O'clock area of disc 14. The explosive or combustion force on adjacent vane 49 moves the vane 49, and the entire disc 14, in a counter-clockwise direction expanding the enclosed volume of combustion gases disposed between vane 49 and dam 72 (FIG. 9A). As illustrated, and as discussed hereinbefore, each of the disc annular channels 28,29 has two vanes, with the angles between the vanes being 150 and 210 degrees, in the preferred embodiment.

The force of the described explosion or combustion of the air/fuel mixture rotates vane 49 (and disc 14) through approximately 165 degrees until it encounters the second dam 73 disposed at the 6:00 O'clock position on the rear essentially flat surface face (FIG. 9B) on partition 13. At this time, vane 49 is again compressed, against its biasing springs 50, into the interior of disc 14 and passes over dam 73. This portion of the disc rotation corresponds to the power stroke in a four cycle piston engine. The exhaust gasses, or combustion by-products, are left in the space between dams 72 and 73. As the first vane 49 passes over the second dam 73, the second vane 48, trailing vane 49 by 210 degrees, passes over dam 72 and starts to compress the exhaust gases and to push them towards dam 73. The exhaust port 82 is open in the front surface of dam 73 and permits exit of the exhaust gases from motor 10 via exhaust port 22 (FIG. 1).

When vane 49 completes its power stroke and has passed over dam 73, an intake port 80 is opened (via plate valve 116) and, as vane 49 continues its rotation from the 6:00 O'clock position of dam 73 to the 12:00 O'clock position of dam 72, an air/fuel mixture is drawn into annular channel 29 through port 80. After vane 49 passes over dam 73, the air/fuel mixture is compressed by vane 48 as it is turned from the 6:00 O'clock position towards dam 72 at the 12:00 O'clock position. When vane 48 is within approximately ten-fifteen degrees of dam 72, a port 58 opens causing the compressed air/fuel mixture to pass through transfer port 58 in partition 13 and into the annular channel 28 of the front disc 12. When the compressed air/fuel mixture enters channel 28, it is ignited by spark plug 81 (FIG. 6B). The combustion or explosion of this compressed air/fuel mixture creates a force on vane 42 and attached rotary disc 12, causing them to move in a clockwise manner while expanding the enclosed volume, and the cycle is repeated.

It is an operational feature of the present invention that rotary discs 12 and 14 rotate in opposite directions with the forward disc 12 and engine shaft 15 rotating clockwise, and the rear disc 14 rotating in a counter-clockwise direction.

Figure 18:
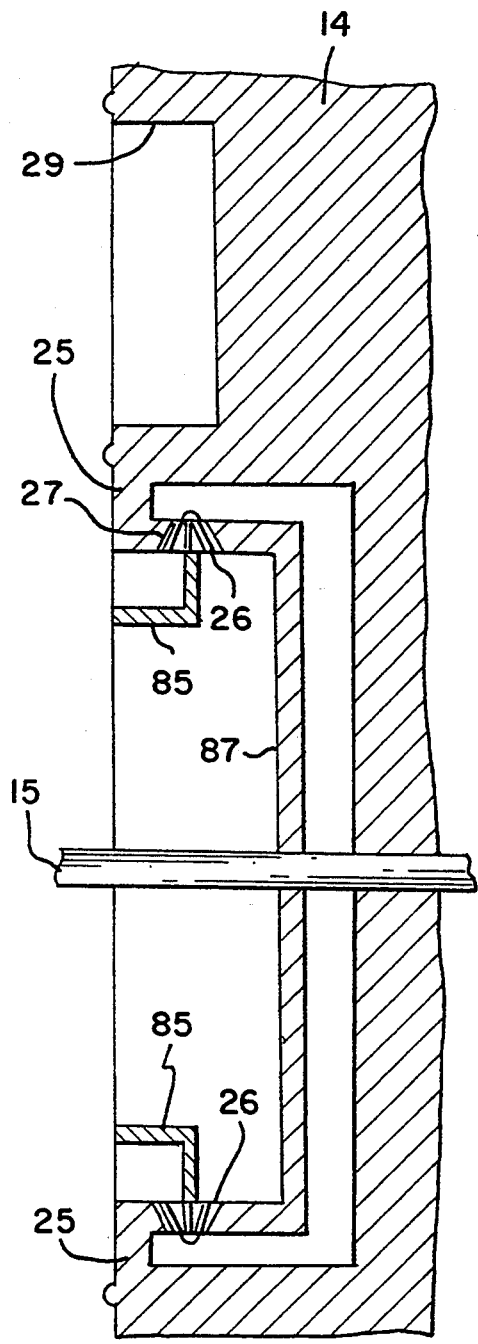
FIG. 18 is a part schematic, part sectional, view of the geared system for supporting and controlling the rotation of the rear rotary disc of the present invention.

The rear disc 14 is not directly attached to the drive shaft 15, but is rotatably disposed thereon through a geared connection, as discussed hereinbefore in reference to FIGS. 2 and 4. The details for one specific geared connection are more clearly illustrated in FIG. 18. As shown therein, the front surface of rear rotary disc 14 is provided with a central recessed area therein, with an inturned segment 25 extending normal and laterally into this cavity and provided with gear teeth 27. A series of bent arms 85 extend from the rear surface of partition 13. Each of bent arms 85 is provided with an arm section normal to the rear surface of partition 13 and aligned outwardly and radially from drive shaft 15. Each of these arm segments supports a freely rotating pinion gear 26. Each pinion gear 26 is provided with beveled sides having gear teeth thereon to engage gear teeth 27 on rear disc ring gear 25.

Drive shaft 15 is provided with an attached gear wheel 87 and provided with a gear toothed front surface thereon that engages pinion gears 26. The gear teeth on gear ring 27 also engage the teeth of pinion gears 26 attached to depending bent arms 85.

This geared arrangement assures that front rotary disc 12, attached to drive shaft 15, and rear rotary disc 14, rotatably disposed on drive shaft 15 for counter-rotation therewith, always operate so that the angular velocity of both discs is always equal. Thus, irrespective of the speed of rotation of motor 10, the vanes of the front disc 12 always intersect the vanes on rear disc 14 at the same point of rotation. Two discs are employed in the rotary engine of the present invention because each disc is used to intake the air/fuel mixture and compress it after which, it is transferred to the other disc, where it is exploded and exhausted. The interior partition 13 is several inches thick and is provided with various openings and passageways therethrough to accommodate the described features. The surfaces of partition 13 engaging discs 12 and 14 are essentially circular and partition 13 may be integral with, or fixedly attached to, engine housing 11 in any conventional manner.

The firing cycle for the rotary combustion engine 10 of the present invention is schematically illustrated in the sequence of drawings FIGS. 11A through 15B. As shown therein, FIGS. 11A and 11B illustrate the respective relative positions of rotary discs 12 and 14 at the beginning of a firing cycle. The vanes for the forward disc 12, in each of the FIGS, are designated by reference numerals 42,43 while the vanes for rear disc 14 are designated by reference numerals 48,49. Dams for the forward disc 12 in each of these FIGS are designated by reference numerals 52,53 while the dams on partition 13 for the rear disc 14 are designated by reference numerals 72,73.

It is an important aspect of the present invention that front and rear discs 12 and 14 be disposed on drive shaft such that the vane 42 on front disc 12 always intersects with vane 48 on rear disc 14 at essentially 5-15 degrees to the right of upper dams 42 and 72, respectively, as depicted at the 12:00 O'clock position in FIGS. 11A through 15B. Similarly, vane 43 on front disc 12 always intersects with vane 49 on rear disc 14 at essentially 5-15 degrees to the left of upper dams 42 and 72.

In FIG. 11 B, vane 48 is shown rotating in a counter-clockwise direction and at approximately fifteen degrees to the right of dam 72. Immediately before arrival at this point, vane 48 was compressing the air/fuel mixture between it and dam 72. A transfer port 58 extends through dam 72 on partition 13, into dam 52 (as described hereinbefore in reference to FIG. 9A) to provide fluid communication between annular channels 28 and 29 in discs 12 and 14.

In FIG. 11A, illustrating forward disc 12, at this same time, vane 42 therein is approximately fifteen degrees to the right of upper dam 52, and is rotating in a clockwise direction. Also, shown therein, is the other end of fuel transport port 58 and located between vane 42 and dam 52. The valve controlling transfer port 58 opens when vane 48 of rear disc 14 is within approximately fifteen degrees in front of dam 72 and the compressed gases therein are transferred from rear disc 14 to front disc 12 where vane 42 is moving away from dam 52 in a clockwise direction. At the instant the valve in transport passageway 58 closes, the compressed air/fuel mixture in the forward disc is ignited by a spark plug (as described hereinbefore) forcing vane 42 away from dam 52 and rotating attached disc 12 in a clockwise direction.

As described hereinbefore, vane 43 is positioned on disc 12 approximately 150 degrees ahead of vane 42, as measured in a clockwise direction. Also, vane 48 on disc 13 is disposed approximately 150 degrees ahead of vane 49, as measured in a counter-clockwise direction.

FIGS. 12A and 12B illustrate the engine situation when discs 12 and 14 have rotated 180 degrees, respectively, from the position shown in FIGS. 11A and 11B. In this situation, forward disc vane 43 has moved from the 5:00 O'clock position to the 10:00 O'clock location, compressing the air/fuel mixture in its path. When vane 43 reaches the 10:00 O'clock position, a fuel transfer port 59 opens allowing the compressed air/fuel mixture to travel through partition 13 into rear disc 14 where it enters the space between vane 49 and dam 72. Vane 49 is moving in a counter-clockwise direction and, as soon as port 59 is closed by the valve therein, the compressed air/fuel mixture is ignited by spark plug 67 (FIG. 9A) to accelerate vane 49 in a counter-clockwise direction.

FIGS. 13A and 13B show the forward and rear discs 12 and 14 at the 360 degree point of rotation, from that shown in FIGS. 11A and 11B. That is, vane 42 has rotated 360 degrees and just passed over dam 52 completing the intake segment. When vane 42 moves to a point 5-15 degrees to the right of dam 52, the air/fuel mixture from rear disc 14 is received and ignited after the transfer valve closes.

The ignition explosion accelerates vane 42 in a clockwise direction. At the time ignition occurs, vane 43 is nearing the 6:00 O'clock position completing the exhaustion of the gases left from the previous ignition. These gases escape through port 61 into the interior of partition 13. Port 61 is shown along the path of vane movement just before dam 53 in this illustration. FIG 13B illustrates the location of vanes 48,49 of rear disc 14 at the same instant and time as shown for vanes 42,43 in forward disc 12. Vane 48 is shown approximately ten degrees to the right and moving towards, upper dam 72 in a counter-clockwise motion. This is the point of disc rotation where the compressed air/fuel mixture is being transferred through port 58 from rear disc 14 to forward disc 12. Vane 49, which is 150 degrees behind vane 48, has completed its firing stroke and has passed over lower dam 73 to a position approximately ten degrees to the right of dam 73. At this point, an intake valve 80 has opened and vane 49 is beginning its intake segment.

FIGS. 14A and 14B show the location of discs 12 and 14 and their contained vanes 450 degrees from their location depicted in FIGS. 11A and 11B and 90 degrees after that shown in FIGS. 13A and 13B. FIG. 14A shows vane 42 of the forward disc 12 in the firing segment and vane 43 is shown in its compression segment. FIG. 14B shows rear disc vane 49 in its intake segment. An air/fuel mixture enters intake port 80 located immediately to the right of lower dam 73. Vane 48 is in the exhaust segment and is moving the exhaust gases toward an open exhaust port 82 immediately to the left of lower dam 73.

FIGS. 15A and 15B show the forward and rear discs 12 and 14 in the positions they would occupy when rotated 580 degrees beyond their initial position shown in FIGS. 11A and 11B. FIG. 15A shows the forward disc 12 at a time when vane 42 is moving away from lower dam 53 and the intake valve 62 immediately to the left of lower dam 53, is open and an air/fuel mixture is moving into the space left behind by vane 42. Vane 43 is beginning its exhaust segment and will push the exhaust gases out of exhaust port 61. FIG 15B shows rear disc 14 when vane 49 is in its firing segment, having received a transfer of the air/fuel mixture as it passed transfer port 59. Vane 48, which is 150 degrees ahead of vane 49, is beginning the compression stroke that will end when it approaches upper dam 72. At this point, the compressed air/fuel mixture will be transferred through transport port 58 to front disc 12 to complete the cycle.

Figure 16A:
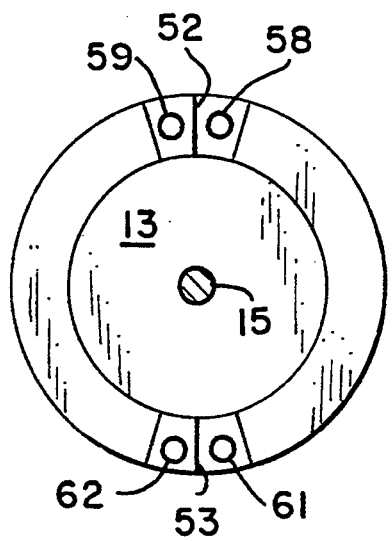
FIGS. 16A and 16B schematically illustrate the ducts or passageways through the partition as seen, respectively, from the front and rear surfaces thereof.
Figure 16B:
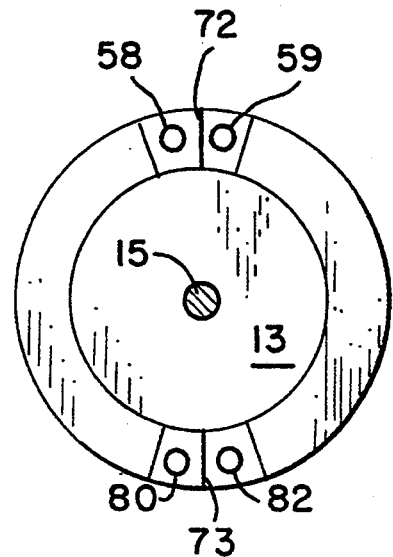

FIGS. 16A and 16B schematically show the features, respectively, for the front and rear essentially flat surfaces of partition 13. The schematic view of FIG. 16A is taken looking in the direction of partition 13, with front disc 12 being removed therefrom, and the illustration of FIG. 16B is taken from the rear or looking in the direction of partition 13, with disc 14 being removed therefrom.

In the preferred embodiment, the dam closures are disposed at the 12:00 O'clock and 6:00 O'clock positions on each essentially flat surface face of partition 13. That is, the dams are 180 degrees apart, or directly opposite to each other, as illustrated in FIGS. 16A and 16B.

As schematically shown in FIG. 16A, the raised dams on the front surface of partition 13 are shown at the 12:00 and 6:00 O'clock positions and designated, respectively, by reference numerals 52 and 53. Immediately to the left and right, and approximately five degrees from the center of upper dam 52, on each respective sloping surface thereof, are transfer ports 58, 59 which pass directly and perpendicularly through the interior of partition 13, as described hereinbefore in reference to FIG. 9A. The opening and closing of each transport port 58,59 is controlled by a valve consisting of two counter rotating plates, each of which contain an elongated, arcuate, aperture therethrough. When the elongated, arcuate, apertures are aligned with the respective transfer pod, the valve is open and when the solid pad of the plates pass behind the pod, the valve and port is closed. The exact shaping and operation of these valves will be more fully described hereinafter.

Exhaust ports 61 and 82, leading to the interior of partition 13 for exit of the exhaust gases, is illustrated in FIGS. 16A and 16B. Exhaust port 61 is located on the right side of lower dam 53, and positioned approximately five degrees from the center of lower dam 53. Exhaust gases entering port 61 go through the interior of partition 13 for exit therefrom through a curved tube leading to the outside exit 21 of housing 11 (FIG. 1).

Figure 9B:
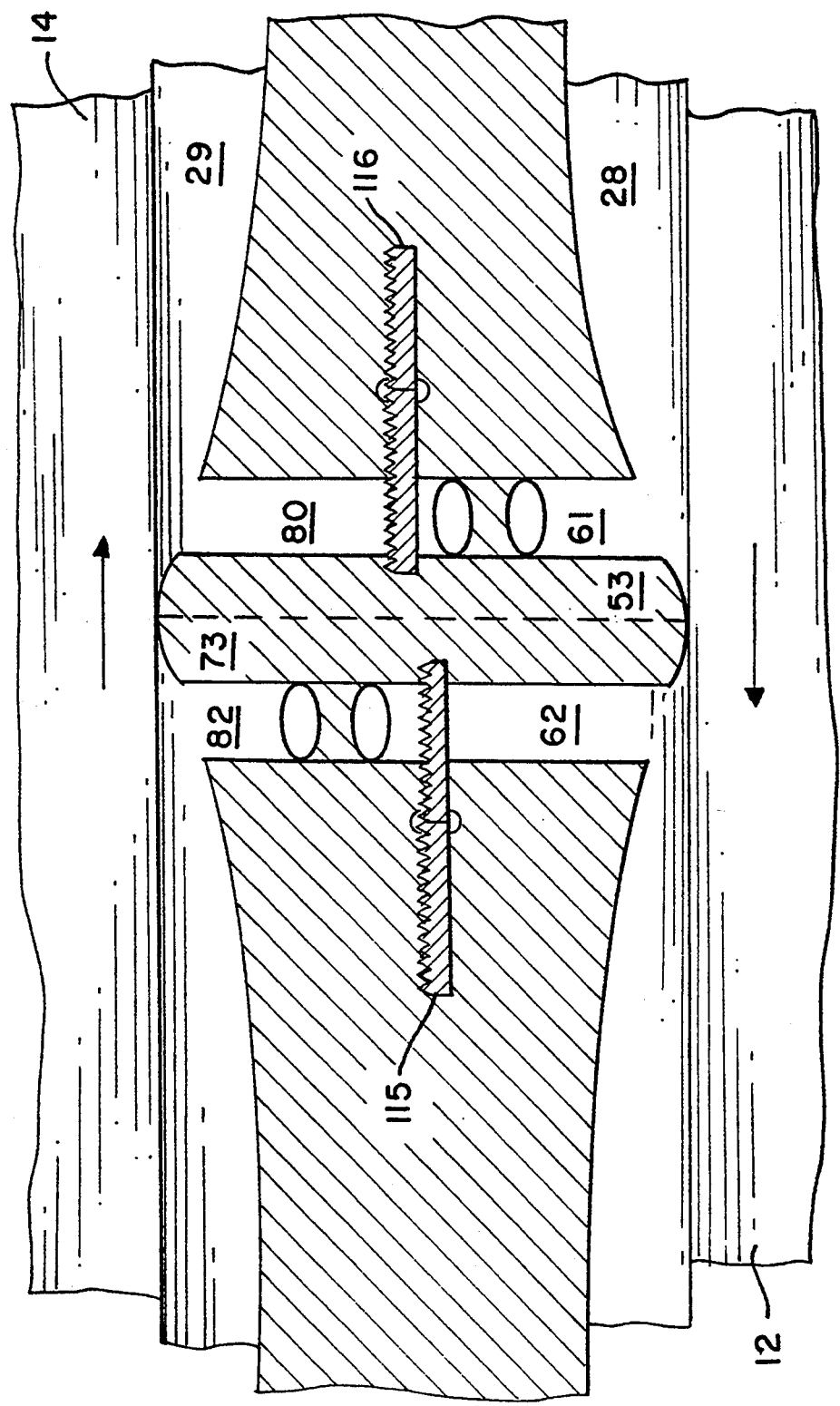
FIG. 9B is a view, similar to FIG. 9A, illustrating the dams disposed at the 6:00 O'clock position on both the front and rear essentially flat surfaces of the partition, and showing the fuel intake and exhaust ports in the dams within the partition member.

On the left side of lower dam 53 and lower dam 73, as shown in FIG 16A and 16B, are intake pods 62 and 80. These intake ports are each also controlled by a rotating circular plate valve 115 and 116, with each valve having an elongated opening therethrough that passes in front of ports 62 and 80, respectively, when the valve is open (FIG. 9B). Plate valves 115,116 are geared to open and close with each revolution of drive shaft 15, as will be further described hereinafter. The intake tube for each intake port leading to the fuel supply passes through partition 13 and through engine housing 11, as designated by reference numerals 17, 18 (FIG. 1). A suitable carburetor or fuel injection system, not illustrated, supplies fuel to the intake system. Valves to control the exhaust pods are unnecessary since the movement of the vanes control their functioning.

When the rear surface of partition 13 is viewed, as illustrated in FIG 16B, two transfer pods 58,59 are shown located approximately five degrees to the immediate left and right of the center line of upper dam 72 and on the sloping surfaces thereof. These pods 58,59 each open into a tubular passageway passing directly and perpendicularly from the rear surface of partition 13 to the front surface thereof.

Figure 16C:
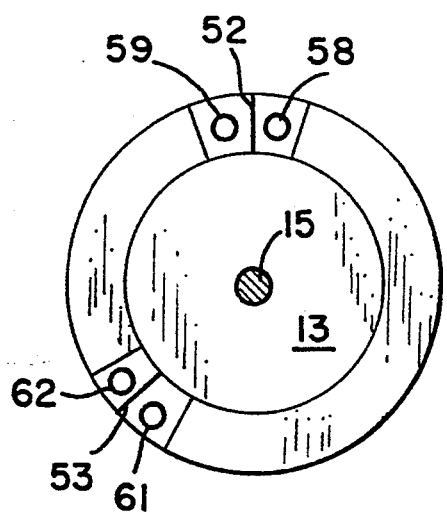
FIGS. 16C and 16D are similar to FIGS. 16A and 16B and illustrate a modification in the location of the lower dams and intake and exhaust passageways in the respective front and rear surfaces of the partition.
Figure 16D:
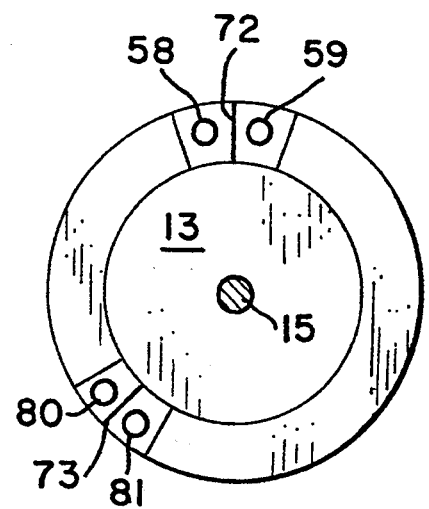

FIGS. 16C and 16D are similar to FIGS. 16A and 16B and illustrate a modification in the relative location of the upper and lower dam members. In this modification, the lower dams 53 and 73 are disposed at substantially the 8:00 O'clock position, while upper dams 52 and 72 remain at the 12:00 O'clock position. The intake and exhaust ports, as well as the transfer ports in the dams, remain in the same relative position to their respective dams.

This modification provides a more compact intake and compression chamber that could improve fuel efficiency and would permit an intake segment having a lesser volume than the combustion segment.

Figure 17A:
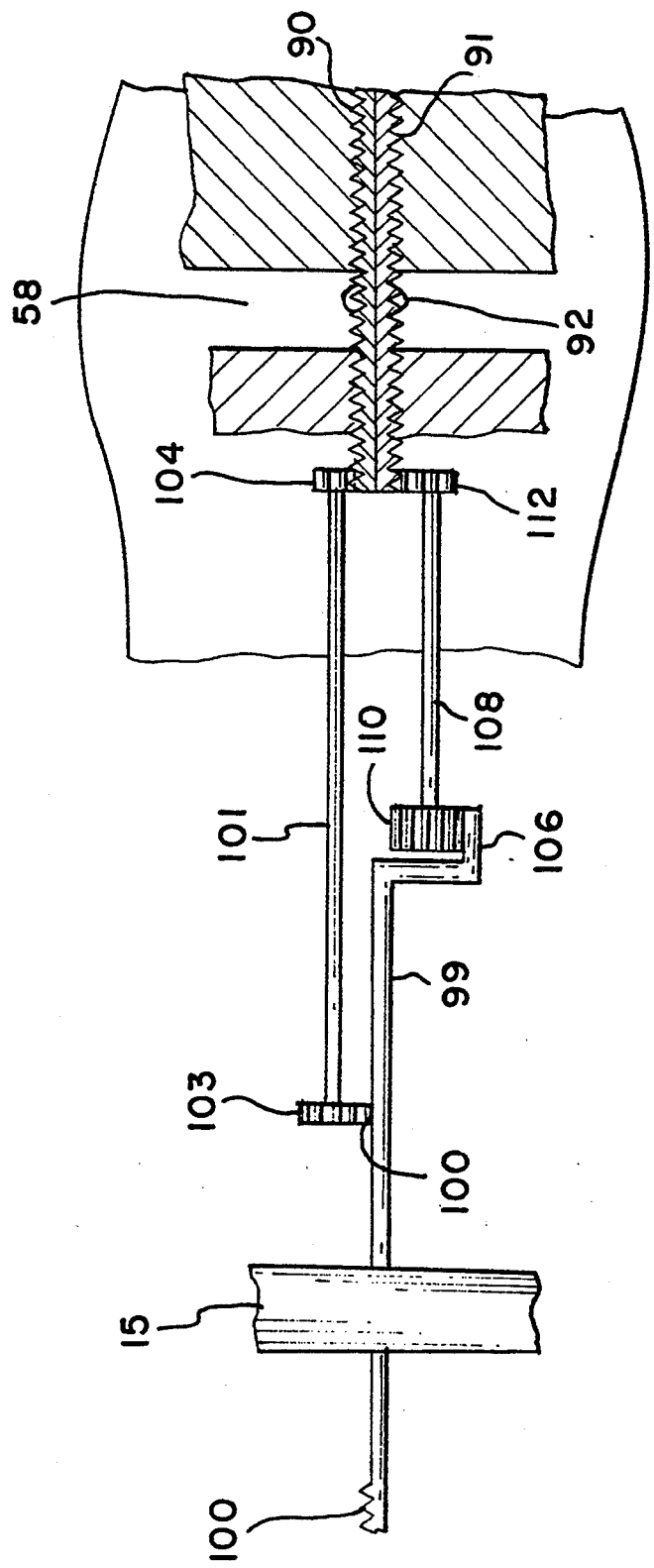
FIG. 17A is a part schematic, part sectional, view of the geared mechanism effecting rotation of the valve system disposed within the partition for controlling fuel mixture flow between the front and rear rotary discs.
Figure 17B:
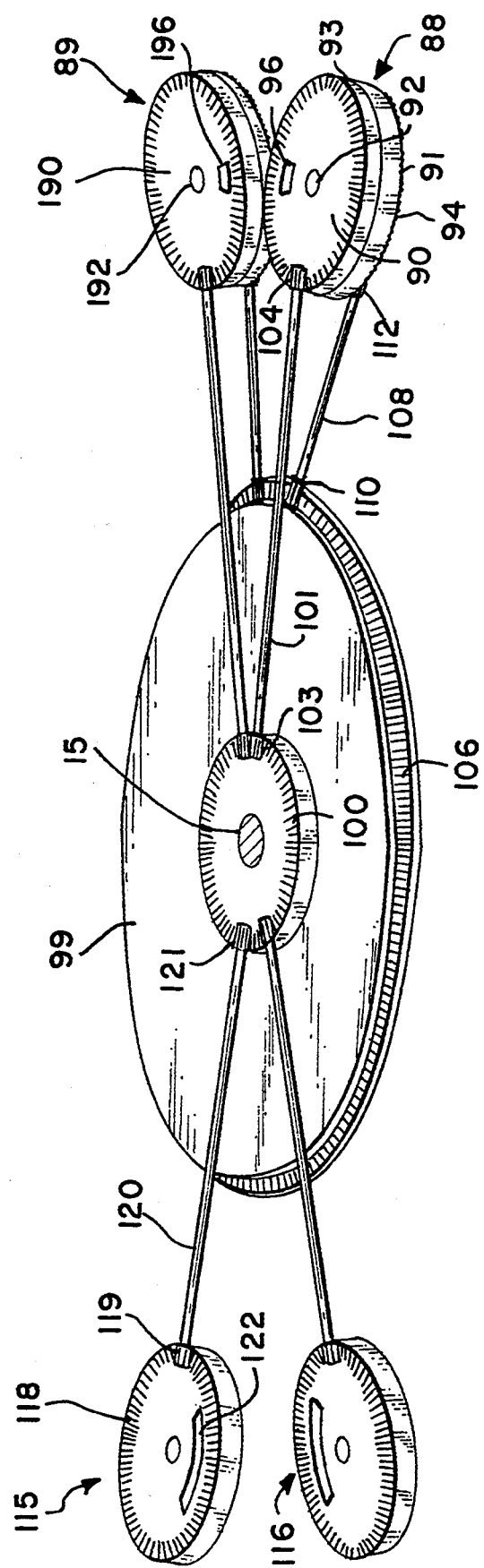
FIG. 17B is a schematic perspective view of the valve control system illustrated in FIG. 17A.

As discussed hereinbefore, the opening and closing of transfer ports 58,59 are controlled by a pair of respective circular valves 88,89, with each valve being formed by two counter-rotating circular plates. For the sake of brevity, only one of the circular valves (valve 88) will be described in detail, it being understood that the two circular valve 89 is essentially identical in structure and operation. Each of the counter-rotating plates in each circular valve is provided with an elongated, arcuate, opening therethrough. These openings are designed to align with each other, and with one of ports 58,59, as more clearly shown in FIGS. 17A and 17B. Referring to FIG. 17A, a pair of counter-rotating plates 90,91 are shown disposed in abutting, rotating, relationship on an axle 92, so as to extend radially through, and close, fuel transfer port 58. Each of plates 90,91 is provided with a smooth surface and a geared surface. The smooth surfaces are disposed in an abutting, rotating, relationship and the geared surfaces are provided with vertically extending gear teeth 93,94 along the respective circular peripheral surfaces thereof.

Each of the circular plates 90,91 is provided with an arcuate passageway therethrough and spaced between the axle 92 and the gear teeth 93,94. These passageways are illustrated in alignment in FIG. 17B and designated, respectfully, by reference numerals 96,97.

Rotation of circular transfer valve plates 90,91 is effected and controlled by rotation of drive shaft 15. A ring gear 99 is secured for rotation with drive shaft 15. Ring gear 99 is provided with a first, circular row, set of vertically extending, gear teeth 100 disposed about, and spaced from, drive shaft 15. The circular row of gear teeth 100 is disposed from the center of drive shaft 15 a distance equal to the radius of transfer valve plates 90,91. A first connecting shaft 101 is provided with a gear on each end thereof, as designated by reference numerals 103,104. Gear 103 meshes with the circular row of gear teeth 100, while gear 104 meshes with the gear teeth 93 on circular plate 90.

Ring gear 99 is provided with a second circular set of gear teeth 106 disposed on a depending ring at the circumference of ring gear 99. The radius of this outer ring of gear teeth 106 is three times the radius of gear teeth 94 on the rear surface of valve plate 91. A second connecting shaft 108 is provided with a gear on each end thereof, as designated by reference numerals 110, 112. Gear 110 meshes with the second circular set of gear teeth 106, while gear 112 meshes with the gear teeth 94 on circular plate 91. The effect of this geared arrangement is that front valve plate 90 rotates once for each engine shaft revolution, while rear valve plate 91 rotates in the opposite direction three times for each engine shaft revolution.

As described hereinbefore, the openings 96, 97 through respective valve plates 90,91 are arcuate or, have sides that are radial lines, and are concentric with the center of the plates disposed on axle 92. In a specific embodiment of the present invention, opening 96 in plate 90 has an arc width of fifteen degrees, while opening 97 in the rear and faster rotating plate 91, has a width of twenty-five degrees. By this arrangement, transfer port 58 is fully open after five degrees of engine shaft movement, remains fully open for the next five degrees, and closes during the final five degrees of engine shaft movement.

As stated, valve 89 is of substantial identical structure and operation as valve 88 with circular valve plates 190 and 191 on axle 192 therein effecting the opening and closing of transfer port 59.

As described hereinbefore in reference to FIG. 9B, the engine intake ports 62 and 80 are fitted with respective circular valves 115 and 116. Each of these intake valves has a single circular plate that makes one revolution with each rotation of the engine shaft 15. For purposes of brevity, only plate valve 115 will be described in detail, it being understood that plate valve 116 is essentially identical in structure and function. As shown more clearly in FIG 17B, plate valve 115 consists of a single plate having a smooth bottom surface and a top surface provided with a ring of gear teeth along the circumference thereof, as designated by reference numeral 118. Gear teeth 118 mesh with a gear 119 disposed at one end of a connecting shaft 120. An additional gear 121 is disposed on the other end of connecting shaft 120 and meshes with the circular row of gear teeth 100 on the top surface of ring gear 99. An arcuate opening 122 is provided through plate valve 115. Opening 122 has an arc width of 120 degrees (instead of the 15 degrees for plate 90) since the intake segments of each engine revolution are longer that the transfer segment. The radius of the intake valve plates is the same as that of transfer valve plate 90. As stated, plate valve 116 is identical in structure and function to valve 115 and is not described further in the interest of brevity.

The structural components, and the operation of the rotary internal combustion engine of the present invention, is believed apparent from the foregoing description. As stated, one of the objects of the present invention is to reduce to an absolute minimum the number of reciprocating parts and to further reduce the weight and movement of any reciprocating parts that remain. The only reciprocating moving parts in the invention are vanes 42,43 and 48,49 which occupy chambers 28,29 respectively, until they encounter the raised dam surfaces. At this encounter, the vanes are moved laterally into the interior of their respective discs by compressing the biasing springs acting thereon.

When the vanes pass over the dam areas the springs push them back into the channel area. Thus, some reciprocal motion is involved in the motor operation. However, this motion is minimized by providing that the width of channels 28,29 be several times their respective depths. Also, the center of gravity of each vane 42,43 and 48,49 is always at the same distance from the center of rotation of motor 11. Consequently, the momentum of the system is always the same and the limited reciprocal movement of the vanes does not retard the action of motor 11. As discussed hereinbefore, it is an important aspect of the present invention that front and rear discs 12 and 14 be disposed on drive shaft 15 such that the vane 42 on front disc 12 always intersects or is phased with vane 48 on rear disc 14 at essentially 5–15 degrees to the right of upper dams 52,72, respectively, as depicted at the 12:00 O'clock position in FIGS. 11A through 15B. Similarly, vane 43 on front disc 12 intersects, or phases, with vane 49 on rear disc 14 at essentially 5–15 degrees to the left of upper dam 52 and 72.

As discussed hereinbefore, the grooves in the side walls of channels 28,29 for controlling the vanes in each of discs 12 and 14 are essentially perpendicular to the surface of partition 13 in one embodiment of the invention. In the preferred embodiment, described in reference to FIG. 7B, grooves 64,65 maintain vane 49 (and similar grooves maintain the other vanes) at an angle of approximately 30 degrees from the perpendicular. In this preferred embodiment, the vanes are more normal to the first contacted surface of the inclined or sloping dam to thereby more easily handle the force of impact with the dam during disc rotation.

In order to provide an air tight combustion chamber, the dam sides and top are fitted with conventional spring blade type seals (not illustrated). In some instances the vanes may be provided with full width end rollers to further reduce the frictional contact with the dams. In this latter scenario, the grooves 64,65 would be provided wider to permit the wider vane tip to lay flush with the bottom of the channels 28,29 when the dam top is passed.

No particular materials have been mentioned for the construction of the rotary internal combustion engine parts of the present invention. Any conventional steel alloy, aluminum alloys, composites and other materials suitable to withstand the temperatures and pressures involved is consider applicable for construction of the present invention. Also, the valve arrangement for the transfer pods and for the intake pods disclosed are for the preferred embodiment only and other valve structures, that perform in the intended manner to achieve the desired results, may be apparent to those skilled in the art in the light of the above teachings.

These and other variations and modifications of the present invention will be readily apparent to those skilled in the art in the light of the above description. Thus, although the invention has been described relative to specific embodiments thereof, it is not so limited.

Accordingly, it is to be understood that, within the scope of the appended claims, the invention may be practiced other than as specifically described herein.

What is claimed as new and desired to be secured by Letters Patent of the United States is:

1. A rotary internal combustion engine comprising:
   a rotatable drive shaft;
   a partition disposed on and rotatably receiving said drive shaft;
   said partition having a first and a second essentially flat side;
   a first disc fixed to said drive shaft and having a surface thereof disposed in abutting relationship with said first essentially flat side of said partition;
   said first disc having an open, annular shaped, channel formed in said surface thereof disposed in abutting relationship with said first essentially flat side of said partition;
   said open, annular shaped, channel in the surface of said first disc being closed by said first essentially flat side of said partition to form a first closed annular chamber;
   said first disc being secured to and rotatable with said rotatable drive shaft;
   a second disc rotatably received by said drive shaft and having a surface thereof disposed in abutting relationship with said second essentially flat side of said partition;
   said second disc having an open, annular shaped, channel formed in said surface thereof disposed in abutting relationship with said second essentially flat side of said partition;
   said open, annular shaped, channel in the surface of said second disc being closed by said second essentially flat side of said partition to form a second closed annular chamber;
   a pair of dam means on each of said first and said second essentially flat sides of said partition;
   a member of said pair of dam means extending into and dividing said closed annular chambers in said first and second discs into respective first and second arcuate chambers;
   means on said drive shaft for rotatably receiving and retaining said second disc in abutting relationship with said partition;
   a first pair of vanes disposed within said first disc and spring biased to extend into contacting relationship with said first essentially flat side of said partition to form a barrier closure within said first annular chamber;
   a second pair of vanes disposed within said second disc and spring biased to extend into contacting relationship with said second essentially flat side of said partition to form a barrier closure within said second annular chamber;
   said first and said second pair of vanes disposed in said first and said second closed annular chambers each extending across one of said closed annular chambers to form first and second compartments in said first and said second annular chambers between said vanes and said pair of dam means;
   at least one of each said first and said second compartments serving as an intake/compression chamber and another of said first and said second compartments serving as a combustion/exhaust chamber; and
   means for receiving an air/fuel mixture into each of said intake/compression chambers and means for initiating combustion and exhausting combustion gases from each of said combustion/exhaust chambers.

2. The rotary internal combustion engine of claim 1 including gear means, said gear means connecting said second disc to said drive shaft to provide opposite rotation of said second disc relative to said first disc.

3. The rotary internal combustion engine of claim 1 wherein each dam of each said pair of dam members is provided with a pair of opposite, inclined, sloping, surfaces and each of said vanes are angularly disposed within said annular chambers such that the inclined, sloping surface of a dam member contacted by one of said vanes during disc rotation is essentially normal to the contacting vane.

4. The rotary internal combustion engine of claim 1 including transfer ports provided in said fixed partition; said transfer ports serving to provide fluid communication between respective first and second intake/compression chambers in said first and said second discs and first and said second combustion/exhaust chambers in said respective first and second discs; and valve means for opening and closing said transfer ports.

5. The rotary internal combustion engine of claim 4 including gear means disposed within said partition; said gear means being connected to said drive shaft and serving to open said valve means to permit (a) transfer of compressed fuel from said first intake/compression chamber to said combustion/exhaust chamber for combustion thereof and (b) to permit transfer of compressed fuel from said second intake/compression chamber to said combustion/exhaust chamber for combustion thereof.

6. The rotary internal combustion engine of claim 1 wherein said means for receiving the air/fuel mixture flow into each of said first and said second intake/compression chambers and said first and said second combustion/exhaust chambers includes fuel intake ports provided in each of said first and said second intake/compression chambers; an air/fuel supply passageway extending through said partition; said fuel intake ports being in fluid communication with said air/fuel supply passageway extending through said partition; and valve means disposed within said partition to open and close said fuel supply passageways to control flow of fuel to said fuel intake ports.

7. The rotary internal combustion engine of claim 6, including gear means connecting said valve means disposed within said partition, to said drive shaft; said gear means serving to open said valve means and permit air/fuel intake into each of said first and said second intake/compression chambers for a limited time relative to each rotation of said drive shaft.

8. The rotary internal combustion engine of claim 1 wherein each member of said first pair of vanes and each member of said second pair of vanes are spaced apart 210 degrees in one direction and 150 degrees in the other direction within their respective annular chambers.

9. A rotary internal combustion engine comprising:
a rotatable drive shaft;
a first rotatable disc secured to and rotatable with said drive shaft;
a second rotatable disc rotatably disposed about said drive shaft;
gear means connecting said second rotatable disc to said drive shaft for opposite rotation relative to said first disc;
a fixed partition having a pair of essentially flat sides and disposed in abutting relationship with, and sandwiched between, said first and said second rotatable discs;
said first and said second discs having respective first and second open, annular shaped, channels formed in a respective surface thereof and disposed in a concentric relationship with said drive shaft;
each said open, annular shaped, channel being closed by one member of said pair of essentially flat sides of said fixed annular partition to form respective first and second annular chambers between each said first and said second disc and said partition;
means extending from said essentially flat sides of said fixed annular partition to close and divide said first and said second annular chambers into first and second arcuate chambers;
a pair of retractable means disposed in said first and said second annular shaped chambers;
said pair of retractable means serving, with said means extending from said partition, to vary the volume of each of said first and said second arcuate chambers to thereby define first and second intake/compression chambers and first and second combustion/exhaust chambers;
means for receiving an air/fuel mixture in said first and said second intake/compression chambers of each of said first and said second arcuate chambers;
ignition means disposed within each said first and said second combustion/exhaust chamber of each of said first and said second arcuate chambers; and
transfer means for transferring compressed air/fuel mixture from said first intake/compression chamber in said first arcuate chamber to said second combustion/exhaust chamber of said second arcuate chamber for combustion, and for transferring compressed air/fuel mixture from said second intake/compression chamber of said second arcuate chamber to said first combustion/exhaust chamber of said first arcuate chamber for combustion.

10. The rotary internal combustion engine of claim 9 wherein said means extending from said essentially flat sides of said fixed partition to close and divide said first and said second annular chambers into said first and said second arcuate chambers comprise a pair of dams disposed within each said first and said second annular chamber, each dam having a pair of opposite, sloping, surfaces leading from said essentially flat sides of said fixed annular partition to a rounded peak height, thereby forming an essentially flattened bell cross-sectional area profile;
each dam being spaced 180 degrees from the other member of the pair on the portion of said essentially flat sides of said fixed annular partition that closes said first and said second open annular shaped channels.

11. The rotary internal combustion engine of claim 9 wherein said means extending from said essentially flat sides of said fixed partition to close and divide each of said first and said second annular chambers into first and second arcuate chambers comprises a pair of dams, each dam having a pair of opposite, sloping, radial, surfaces leading from said essentially flat surfaces of said fixed partition to a rounded peak height, thereby forming an essentially flattened bell, cross-sectional, area profile;
said dams being positioned essentially 120 degrees from each other in a first direction and 240 degrees from each other in a second direction within each of said first and said second annular chambers.

12. The rotary internal combustion engine of claim 9 wherein said pair of retractable means disposed in said annular shaped chamber of each of said first and said second discs are a pair of vanes extending across each said first and said second annular shaped chambers, said pair of vanes in each of said first and said second annular chambers being spaced apart 210 degrees in one direction and 150 degrees in the other direction within said first and said second annular shaped chambers.

13. The rotary internal combustion engine of claim 12 wherein said pair of vanes extending across each of said first and second annular shaped chambers are disposed at an angle of ninety degrees relative to said first and said second annular chambers.

14. The rotary internal combustion engine of claim 12 wherein said pair of vanes extending across each of said first and said second annular shaped chambers are disposed at an angle of thirty degrees relative to said first and said second annular chambers.

15. The rotary internal combustion engine of claim 9 wherein said pair of retractable means disposed in said first and said second annular shaped chambers comprise a pair of vanes extending across each said first and said second annular shaped chambers;
a pair of guide grooves disposed within each said first and said second annular chamber slidably supporting each said vane therein;

a separate cavity in each of said first and said second rotatable discs for retractably receiving one of said vanes therein; and spring means disposed within each said separate cavity for biasing each received vane toward the respective annular first and second channel.

16. The rotary internal combustion engine of claim 9 wherein said means extending from the essentially flat sides of said fixed partition to close and divide said first and said second annular channel in each of said first and said second rotatable discs into first and second arcuate chambers comprises a pair of dams, each dam of said pair of dams having a pair of sloping surfaces leading from one of said essentially flat surfaces on said fixed partition to a rounded peak height, thereby forming an essentially flattened bell, cross sectional, area profile;

said pair of dams on each of said essentially flat surfaces being disposed, essentially 180 degrees apart on each of said essentially flat surfaces of said fixed partition;

said pair of retractable means comprising a pair of vanes extending across each of said first and said second annular chamber; and each of said vanes being angularly disposed within each of said first and said second annular chamber.

17. The rotary internal combustion engine of claim 16 wherein said pair of vanes extending across each of said first and said second annular chamber are each provided with spring means individually biasing each of said vanes toward one of said essentially flat sides of said partition and wherein, during disc rotation, said sloping surfaces of said dams force each said vane against the force of said spring means to retract said vane out of the annular chamber.

* * * * *